Aug. 4, 1970 F. TOPOR 3,522,957
SADDLE MOUNTING ARRANGEMENT
Filed Nov. 12, 1968 2 Sheets-Sheet 1
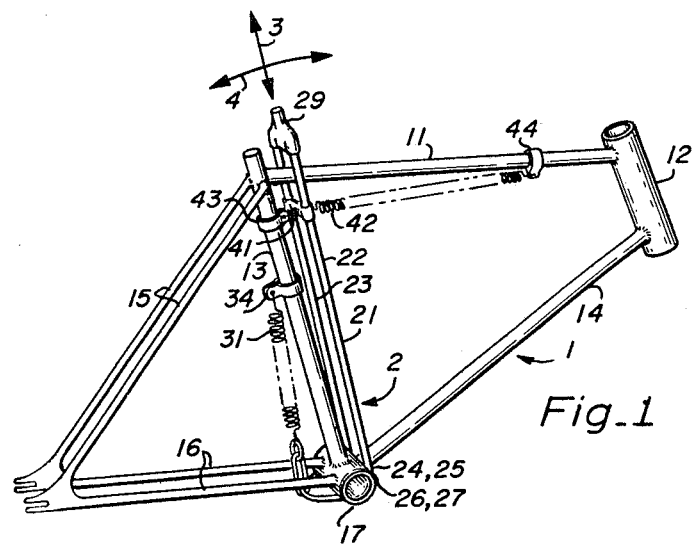
Fig_1
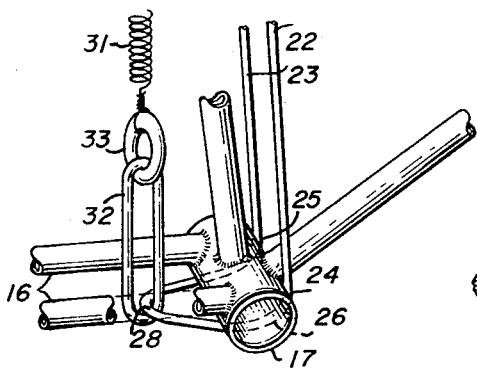
Fig_2
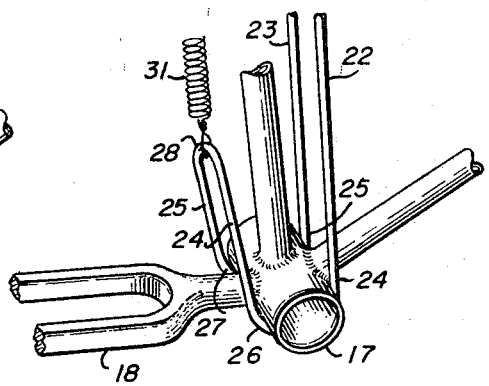
Fig_3
INVENTOR
FRANK TOPOR
BY *Robert C. Webster*
ATTORNEY Aug. 4, 1970  F. TOPOR  3,522,957
SADDLE MOUNTING ARRANGEMENT
Filed Nov. 12, 1968  2 Sheets-Sheet 2
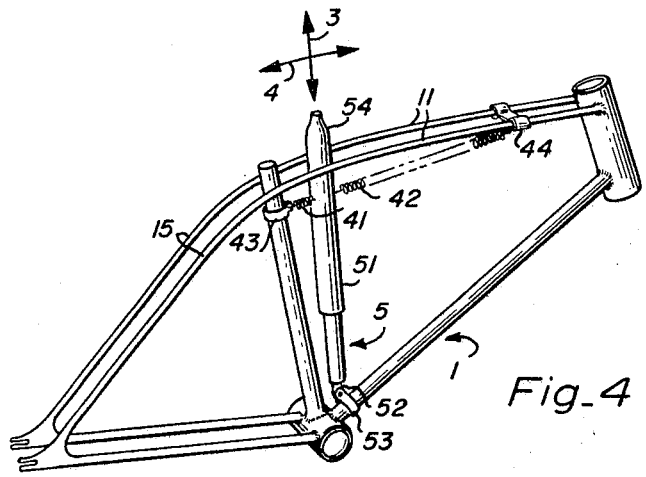
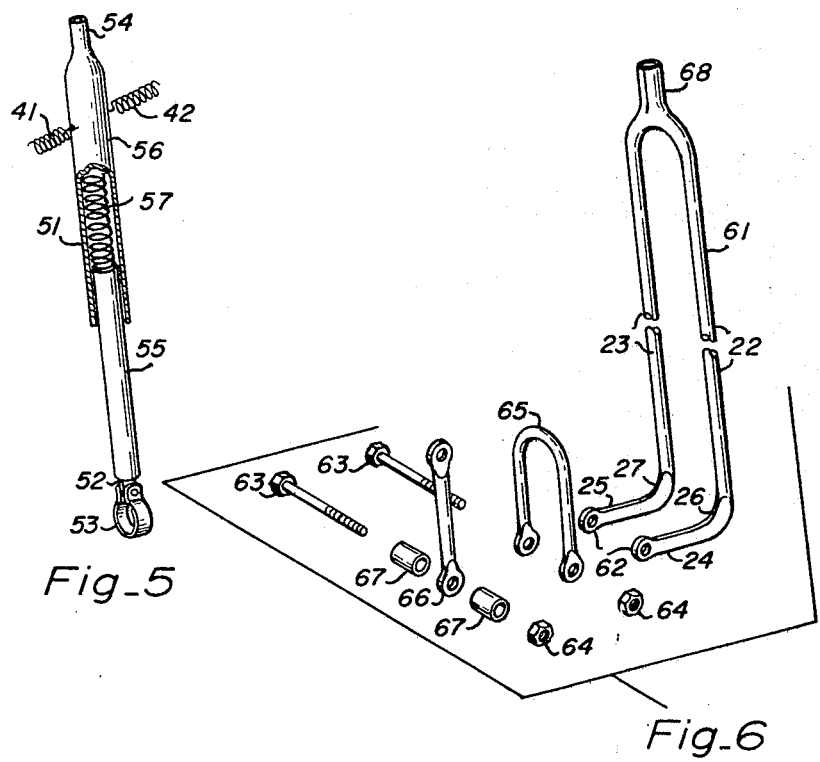
INVENTOR
FRANK TOPOR
BY
*Robert O. Webster*
ATTORNEY United States Patent Office
3,522,957
Patented Aug. 4, 1970

3,522,957
SADDLE MOUNTING ARRANGEMENT
Frank Topor, 4117 Goebel Ave., Palo Alto, Calif. 94306
Filed Nov. 12, 1968, Ser. No. 774,741
Int. Cl. B62k 19/36
U.S. Cl. 280—283                                    2 Claims

ABSTRACT OF THE DISCLOSURE

A cycle saddle mounting arrangement having a saddle support mast resiliently supported from a rigid cycle frame.

STATEMENT OF THE INVENTION

This invention relates to an improved support for resiliently mounting a saddle to a cycle frame and more particularly, the invention is directed to a support permitting vertical and longitudinal motion of a bicycle saddle with respect to the frame. The invention provides for a saddle support mast attached to the frame by a plurality of resilient springs which return the saddle to an initial position after movement of the saddle relative to the frame.

DESCRIPTION OF THE PRIOR ART

A variety of devices have been proposed and practiced with an object of enhancing the comfort of a cycle rider through absorption of shocks experienced by a cycle during use. Techniques include shock absorbing wheel mounting, resilient frames and methods of mounting the saddle upon which the rider sits. Saddle mounting methods have been devised to absorb vertical shocks and movement received by a cycle but none have proved satisfactory except the universal practice of building springs into the saddle. The ineffective nature of such saddles is apparent by the not uncommon practice of a cycle rider posting, standing on the pedals or foot rests, to absorb shocks through flexure of his legs.

All cycles experience a longitudinal pitching motion in addition to vertical shock and motion when wheels successively encounter obstacles, holes or other irregularities in the road surface. Such motion and shocks are increased where cycles have the smaller diameter wheels currently popular on both bicycles and motorcycles. Furthermore, shock absorbing techniques presently employed must usually be built into the cycle structure and are thus not adaptable to existing cycles for which a shock absorbing means would be desirable.

Numerous disadvantages are thus apparent in the prior art which limit effectivity and application of existing shock absorbing means. Consequently a need exists for a saddle mounting arrangement which will effectively absorb vertical shocks, prevent imparting longitudinal pitching motion to the rider and be readily adaptable to existing cycle structures.

OBJECTS OF THE INVENTION

It is therefore an objective of the present invention to provide a saddle mounting arrangement for cycles which will permit vertical and longitudinal motion of a cycle frame without imparting shocks or vibration therefrom to the rider.

Another object is to provide a saddle supporting means which is adjustable to accommodate variations in size, weight and desired seating positions of individual cycle riders.

A still further objective is to provide a simple and inexpensive saddle support arrangement which does not detract from the appearance and not materially increase the weight of a cycle.

Other objects and advantages of the invention will become readily apparent from the following description of preferred embodiments of the invention when read in connection with the accompanying drawings in which:

BRIEF DESCRIPTION OF THE DRAWINGS

FIG. 1 is a perspective view of a cycle frame and saddle mounting arrangement embodying the invention.

FIG. 2 is a fragmentary perspective view of the lower portion of saddle mounting arrangement of FIG. 1.

FIG. 3 is a fragmentary perspective view of the lower portion of a saddle mounting arrangement adapted to accommodate a bifurcated rear fork.

FIG. 4 is a perspective view of a double bar cycle frame and saddle mounting arrangement embodying the invention.

FIG. 5 is a perspective view, partly in section, of the saddle mounting arrangement employed in FIG. 4.

FIG. 6 is an exploded perspective view of a hinged saddle support mast in accordance with the invention.

DESCRIPTION OF THE PREFERRED EMBODIMENTS

Referring now to the figures in which like reference characters designate like parts, and particularly to FIG. 1 there is shown a perspective view of a conventional rigid quadrangular cycle frame 1 to which is added a saddle mounting arrangement 2 in accordance with the invention. The frame 1 comprises, in a rigid assembly, an upper horizontal bar 11, a steering head 12, an upright bar 13, an inclined truss bar 14, upper and lower rear forks 15 and 16 and a crank housing 17. Mounted to frame 1 is a saddle mounting arrangement 2 comprising a saddle support mast 21 resiliently supported to the frame 1. The saddle support mast 21 has two mutually parallel rigid columnar members 22 and 23 disposed on either side of horizontal bar 11 and truss bar 14. The lower 24 and 25 of columnar members 22 and 23 have arcuate curvatures 26 and 27 slidably engaging crank housing 17 and terminating at a juncture 28 common to the two columnar members 22 and 23. Upper ends of columnar members 22 and 23 extend above horizontal bar 11 and are provided with an adapter 29 therebetween to accommodate mounting of a cycle saddle thereon.

Columnar members 22 and 23 are thus in slidable engagement with horizontal bar 11 and truss bar 14 receiving constraint to lateral movement therefrom. Slidable engagement of columnar members 22 and 23 with crank housing 17 provides restraint to longitudinal motion between lower ends 24 and 25 of columnar members 22 and 23 with crank housing 17 without constraining vertical or longitudinal rotational motion therebetween.

A tension spring 31 is secured to the juncture 28 of columnar members 22 and 23 through connecting links 32 and 33, as best seen in FIG. 2. The spring 31 extends upwardly along upright bar 13 and is adjustably attached to upright bar 13 by a clamp 34. Tension spring 31 provides an upwardly biased resilient support for saddle support mast 21 from frame 1. Note that link 33 may be made too large to pass between lower rear forks 16, thus limiting downward motion of support mast 21 with respect to frame 1.

Paired tension springs 41 and 42 are connected to saddle support mast 21 intermediate the ends thereof and are attached to upright frame bar 13 and horizontal bar 11 by clamps 43 and 44 respectively. The paired tension springs 41 and 42 acting in opposition to one another provide resilient longitudinal rotational positioning of saddle support mast 21 about crank housing 17.

The saddle support mast 21 is thus resiliently suspended from cycle frame 1 so that a cycle saddle mounted thereon can perform both vertical and longitudinal rotational excursions, as indicated by directional arrows 3 and 4, about crank housing 17. Selection of strength and spring rates of the springs and locations selected for attaching to the frame will provide sufficient resilient restraint to balance the weight of the rider so that, when seated on the saddle, the rider is practically suspended by the springs and isolated from shock and movement experienced by the cycle frame.

FIG. 3 illustrates an alternative embodiment of the invention as particularly applied to a cycle frame of the Columbia or Moulton type having a bifurcated lower rear fork member 18. In this arrangement the arcuate curvatures 26 and 27 of columnar members 22 and 23 continue around crank housing 17 the ends 24 and 25 terminating at a common juncture 28 above the rear fork member 18. Space permitting, such a simplified arrangement provides all the operational characteristics of a multiple element support mast depicted in FIG. 1.

An alternative embodiment of the invention is illustrated in FIG. 4 wherein a cycle frame 1 having a dual horizontal upper bar 11 arrangement constituting extensions of the upper rear forks 15, is provided with a saddle mounting arrangement 5. The saddle mounting arrangement comprises a telescoping tubular cushion post 51 about hinged clamp 53. Thus rider sitting on a cycle the frame through a hinged clamp 53 and the upper end 54 being slidably constrained between the two horizontal bars 11.

The cushion post 51 has an inner tubular section 55, see FIG. 5, slidable within an outer tubular section 56. A compression spring 57 interposed between inner tubular section 55 and outer tubular section 56 provides a resilient restraint to compressive columnar forces or motion on cushion post 51. The upper end 54 of the tubular section 56 is adapted to receive a cycle saddle and provision made to accept connections of paired tension springs 41 and 42 intermediate the ends thereof.

In use the compression spring 57 provides resilient support of rider's weight and tension springs 41 and 42 provide a bias to longitudinal rotational movement of post 51 about hinged clamp 53. Thus rider stirring on a cycle saddle mounted to the top of cushion post 51 will be isolated by springs 57, 41 and 42 from shock and pitching movement experienced by the cycle frame.

A hinged saddle support mast 61 is illustrated in FIG. 6 which would be applicable to most cycle frames upon proper selection of lower end terminal arrangement. The lower ends 24 and 25 of columnar members 22 and 23 have arcuate curvatures 26 and 27 for slidably engaging crank housings. The lower ends 24 and 25 each terminate at an eye 62 accepting a hinge bolt 63. The clevis 65 and hinge bolt and nut 63 and 64 would accommodate a frame with bifurcated rear fork. Alternatively, a simple link 66, spacers 67 and hinge bolt and nut 63 and 64 would fit the usual two element type rear fork. Note that the upper ends of columnar members 22 and 23 may be cooperatively configured 68 to accommodate mounting of a cycle saddle thereon.

Whereas certain forms of the invention have been shown and described, it should be taken in an illustrative or diagrammatic sense only. There are many variations and modifications which will be apparent to those skilled in the art which will not depart from the scope and spirit of the invention. I, therefore, do not wish to be limited to the precise details of construction set forth, but desire to avail myself of such variations and modifications as come within the scope of the appended claims.

What is claimed is:

1. The combination of:
    a rigid quadrangular cycle frame having a cylindrical crank housing;
    a saddle support mast comprising
        two mutually parallel rigid columnar members disposed on either side of said frame, slidably engaging and laterally constrained by said frame, each said columnar member having a lower end arcuately curved for slidable engagement about said crank housing and terminating at a common juncture between said columnar members, upper ends of said columnar members extending above said frame, and
        an adapter disposed between said upper ends accommodating mounting of a cycle saddle thereon;
    a tension spring connected to said common junction and adjustably attached thereabove to said frame; and
    at least one pair of tension springs oppositely connected across said columnar members and adjustably attached to said frame.

2. The combination of:
    a rigid cycle frame having a cylindrical crank housing; a saddle support mast laterally restrained by said frame; and spring means disposed between said frame and said support mast providing resilient restraint to vertical and longitudinal movement therebetween; said saddle support mast comprising a columnar member slidably engaging and laterally restrained by said frame and having an upper extremity adapted to accommodate mounting a cycle saddle thereon and a lower extremity arcuately configured for slidable engagement about said crank housing, and a link hingedly connected to said lower extremity; and said spring means comprising a tension spring connected at one end thereof to said hinged link and at the other end thereof adjustably to said frame above said hinged link, and a plurality of tension springs connected to said support mast intermediate the ends thereof and adjustably attached to said frame.

References Cited

UNITED STATES PATENTS 593,793  11/1897  Byrne _____ 280—283

FOREIGN PATENTS 118,441  8/1917  Great Britain.

LEO FRIAGLIA, Primary Examiner

R. R. SONG, Assistant Examiner